(12) United States Patent
Eliasson et al.

(10) Patent No.: US 7,338,546 B2
(45) Date of Patent: Mar. 4, 2008

(54) CENTRIFUGAL SEPARATOR FOR CLEANING GAS GENERATED BY AN INTERNAL COMBUSTION ENGINE AND A METHOD FOR OPERATING THE SAME

(75) Inventors: Thomas Eliasson, Huddinge (SE); Stefan Szepessy, Huddinge (SE)

(73) Assignee: Alfa Laval Corporate AB, Lund (SE)

( * ) Notice: Subject to any disclaimer, the term of this patent is extended or adjusted under 35 U.S.C. 154(b) by 6 days.

(21) Appl. No.: 11/407,553

(22) Filed: Apr. 19, 2006

(65) Prior Publication Data
US 2007/0249479 A1    Oct. 25, 2007

(51) Int. Cl.
*B01D 45/00* (2006.01)
(52) U.S. Cl. ............. 55/406; 55/407; 55/423; 55/424; 55/426; 95/270
(58) Field of Classification Search ......... 95/270; 55/400, 406, 407, 423, 424, 426, 434
See application file for complete search history.

(56) References Cited

U.S. PATENT DOCUMENTS

| | | |
|---|---|---|
| 2,799,466 A | 7/1957 | Hickerson |
| 2,921,466 A | 1/1960 | Nerwin, Jr. |
| 3,234,716 A | 2/1966 | Roger et al. |
| 3,949,719 A | 4/1976 | Bellanca et al. |
| 4,194,694 A | 3/1980 | Hickerson |
| 4,651,768 A | 3/1987 | Epe |
| 4,723,346 A | 2/1988 | Tachibana et al. |
| 5,082,030 A | 1/1992 | Bucher |
| 5,564,401 A | 10/1996 | Dickson |
| 5,954,035 A | 9/1999 | Hofer et al. |

(Continued)

FOREIGN PATENT DOCUMENTS

DE          43 11 906 A1    10/1994

(Continued)

*Primary Examiner*—Duane Smith
*Assistant Examiner*—Sonji Turner
(74) *Attorney, Agent, or Firm*—Michaud-Duffy Group LLP (57) ABSTRACT

In a centrifugal separator for cleaning gases generated by an internal combustion engine a housing defines an interior separation chamber. A centrifugal rotor is coupled for rotation to the housing and extends into the separation chamber. A drainage chamber is positioned adjacent the separation chamber and is delimited therefrom by a partition wall. A flow path is provided through which oil, separated from gases generated by the internal combustion engine and collecting on the partition wall, can travel from the separation chamber to the drainage chamber. A pump wheel is coupled to a shaft portion defined by the rotor and extends radially outwardly therefrom. During operation the oil, upon exiting the separation chamber, contacts the pump wheel. Centrifugal forces generated due to the rotation of the pump wheel cause the oil to be thrown into the drainage chamber. The pump wheel also minimizes the potential for oil resident in the drainage chamber to re-enter the separation chamber.

18 Claims, 5 Drawing Sheets

U.S. PATENT DOCUMENTS

| | | |
|---|---|---|
| 6,152,120 A | 11/2000 | Julazadeh |
| 6,155,574 A | 12/2000 | Borgstrom et al. |
| 6,267,204 B1 * | 7/2001 | Kristensen et al. ........ 184/6.16 |
| 6,536,211 B1 | 3/2003 | Borgstrom et al. |
| 6,973,925 B2 | 3/2003 | Borgstrom et al. |
| 6,676,131 B1 | 1/2004 | Hedin |
| 6,751,951 B2 * | 6/2004 | Borgstrom et al. ........... 60/311 |
| 6,755,896 B2 * | 6/2004 | Szepessy et al. ............. 95/270 |
| 6,783,571 B2 | 8/2004 | Ekeroth |
| 6,821,319 B1 | 11/2004 | Moberg et al. |
| 7,022,163 B2 * | 4/2006 | Olsson et al. .................. 95/268 |
| 7,033,411 B2 * | 4/2006 | Carlsson et al. .............. 55/406 |
| 7,052,529 B2 * | 5/2006 | Franzen et al. ............... 95/270 |
| 7,056,363 B2 * | 6/2006 | Carlsson et al. .............. 55/406 |
| 7,152,589 B2 * | 12/2006 | Ekeroth et al. ............. 123/572 |
| 7,250,066 B2 * | 7/2007 | Seipler ........................ 55/337 |
| 2001/0012814 A1 | 8/2001 | May et al. |
| 2004/0107681 A1 | 6/2004 | Carlsson et al. |
| 2007/0163444 A1 * | 7/2007 | Eliasson ...................... 96/281 |

FOREIGN PATENT DOCUMENTS

| | | |
|---|---|---|
| DE | 199 14 166 A1 | 10/2000 |
| EP | 0 122 795 | 10/1984 |
| EP | 1 217 183 A1 | 6/2002 |
| JP | 363005108 A | 1/1988 |
| JP | 2000-279851 | 10/2000 |
| SE | 101843 | 6/1941 |
| WO | WO 99/56883 | 11/1999 |
| WO | WO 01/00969 A1 | 1/2001 |
| WO | WO 01/36103 A1 | 5/2001 |
| WO | WO 2004/091799 A1 | 10/2004 |

* cited by examiner

CENTRIFUGAL SEPARATOR FOR CLEANING GAS GENERATED BY AN INTERNAL COMBUSTION ENGINE AND A METHOD FOR OPERATING THE SAME

FIELD OF THE INVENTION

The present invention is directed to a centrifugal separator useful in the separation of entrained material, including oil, from gases generated by an internal combustion engine whereby the oil is drained from a separation chamber into a drainage chamber.

BACKGROUND OF THE INVENTION

Centrifugal separators useful in separating entrained material, including oil, from gases generated by an internal combustion engine are sometimes configured so that a housing defines a separation chamber into which a centrifuge rotor is positioned. The rotor is typically mounted for rotation in bearings supported by the housing and is driven by a suitable drive coupled to a shaft portion of the rotor that extends through one of the bearings and out of the separation chamber. During operation, oil separated from the gas must be drained from the separation chamber.

Figure 1:
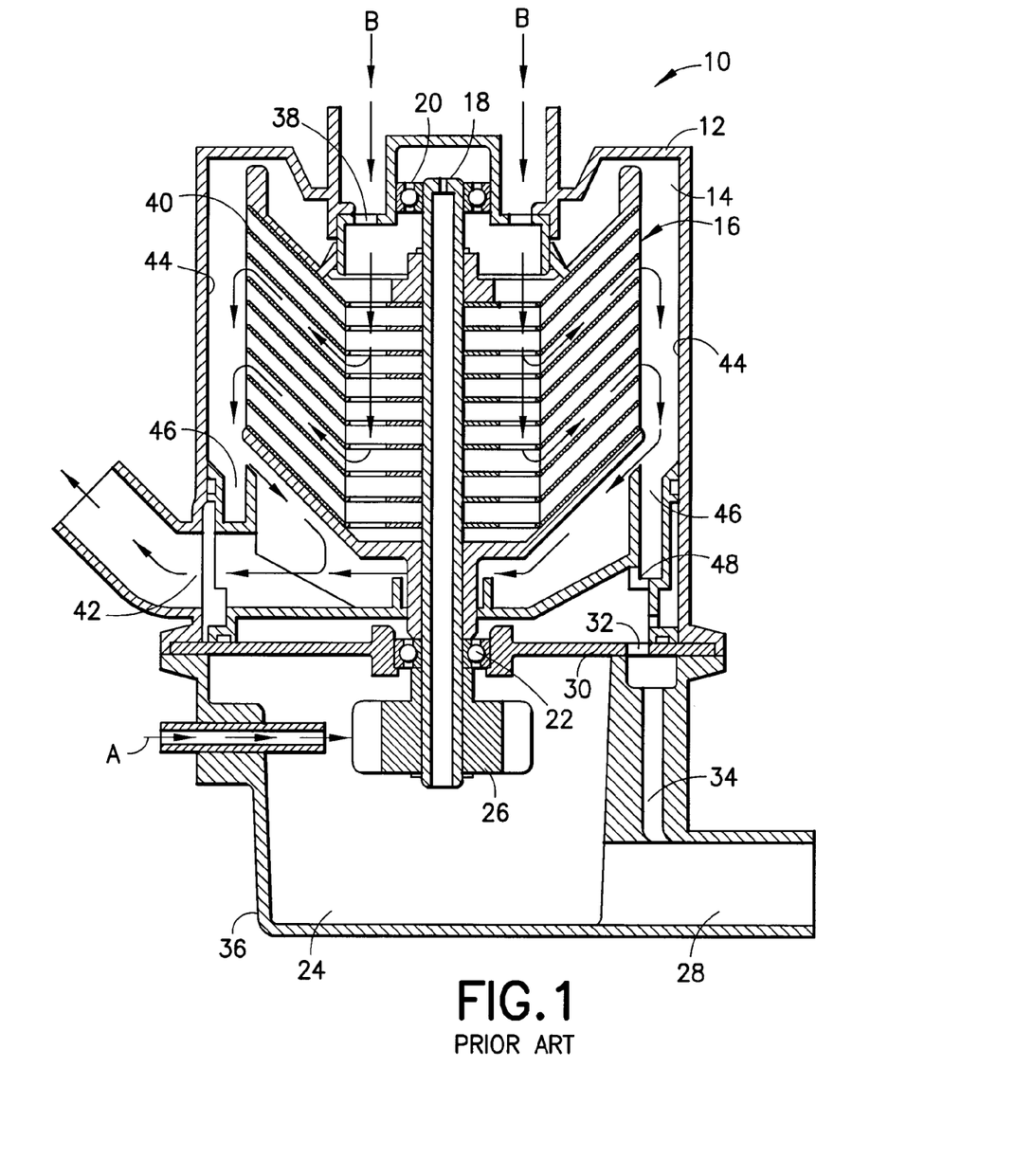
FIG. 1 is a cross-sectional view of a prior art centrifugal separator.

A typical centrifugal separator useful for cleaning gas generated by an internal combustion engine, such as crankcase gas, is shown in FIG. 1 and is generally designated by the reference number 10. The centrifugal separator 10 includes a stationary housing 12 that defines an interior separation chamber 14. A rotor generally designated by the reference number 16 is positioned in the interior area and includes a drive shaft 18 rotatably mounted in upper bearing 20 and lower bearing 22. The drive shaft 18 extends through the lower bearing 22 into a drainage chamber 24. A turbine 26 is positioned in the drainage chamber 24 and is mounted on the drive shaft 18 for rotation therewith. During operation of the centrifugal separator 10, the turbine 26 and thereby the rotor 18 is caused to rotate by a stream of fluid generally indicated by the arrows labeled "A" directed under pressure against the turbine. The liquid used to cause the turbine 26 to rotate is typically oil, either pressurized by the internal combustion engine or another pressure source. The oil, after impinging upon the turbine, exits the drainage chamber 24 through an outlet 28.

A partition wall 30 separates the separation chamber 14 from the drainage chamber 24. An aperture 32 extends through the partition wall 30 near the periphery of the partition wall and opens into a stepped bore 34 defined by a drainage housing 36 in communication with the outlet 28.

During operation, gas generated by the internal combustion engine and generally designated by the reference character "B" enters the separation chamber through apertures 38 and into a stack of rotating separation discs 40. Entrained material is separated from the gas in the separation discs 40 and is thrown from the edges of the discs against an inner wall of the housing 14. This separated material will in all likelihood include oil.

The cleaned gas exits the centrifugal separator via outlet 42, while the oil and other separated material travels down the inner wall 44 and into passage 46. The oil then passes through a first aperture 48 onto the partition wall and through the aperture 32 into the stepped bore 34 and out of the outlet 28.

A difficulty that occurs with the above-described centrifugal separator is that because these devices are used in connection with internal combustion engines, it is possible for the centrifuge to assume different orientations whether due to mounting constraints or, if used in a vehicle, the different attitudes a vehicle may assume during driving. Depending on the degree of incline of the centrifugal separator, there is a potential for separated material such as oil to leak into the cleaned gas and be discharged from the clean gas outlet, thereby defeating the purpose of the centrifugal separator. Another potential problem associated with centrifugal separators configured as described above is that the operation of the turbine and the driving oil being forced there against can cause the driving oil to leak into the separation chamber through the bore 34 and contaminate the cleaned gas, again defeating the purpose of the centrifugal separator. Moreover, the above-described centrifugal separator requires that there be more than one passage/outlet for the egress of oil.

Based on the foregoing, it is the general object of the present invention to provide a centrifugal separator that improves upon or overcomes the problems and drawbacks associated with prior art devices.

SUMMARY OF THE INVENTION

The present invention resides in one aspect in a centrifugal separator for cleaning gases generated by an internal combustion engine. The separator includes a housing defining an interior separation chamber. A centrifugal rotor is rotatably coupled to the housing and extends into the separation chamber. Driving means are also provided and upon operation cause centrifugal rotor to spin. A drainage chamber is positioned adjacent the separation chamber and is delimited therefrom by a partition wall. Means are provided that define a flow path through which oil, separated from gas generated by the internal combustion engine can travel via gravity from the separation chamber to the drainage chamber. These means also allow for pressure to be equalized in the separation and drainage chambers. A pump wheel is coupled to a shaft portion of the rotor and extends radially outwardly therefrom. During operation the oil, upon exiting the separation chamber, contacts the pump wheel whereby centrifugal forces generated due to the rotation of the pump wheel cause the oil to be thrown into the drainage chamber. The pump wheel performs a pumping action when moving oil that contacts the disc from a smaller diameter to a larger diameter, which minimizes the potential for oil resident in the drainage chamber from being able to re-enter the separation chamber.

Preferably, the drive means is a turbine positioned in the drainage chamber and mounted to the shaft portion of the rotor. During operation, a stream of oil is directed, under pressure, against the turbine causing it, and thereby the rotor, to rotate. However, while a turbine has been described, the present invention is not limited in this regard as other suitable drives can be employed, such as, for example an electric motor, without departing from the broader aspects of the present invention.

In an embodiment of the present invention, the means defining a flow path includes a bearing having an inner race mounted on the shaft portion of the rotor and an outer race coupled to the partition wall. During operation, the oil drains via gravity from the separation chamber, through the bearing, and onto the pump wheel where the rotation of the pump wheel imparts centrifugal force to the oil, throwing it off of the pump wheel and into the drainage chamber.

In still another embodiment of the present invention, the pump wheel defines an annular groove extending part-way through the pump wheel and circumferentially there around.

The partition wall includes a downwardly depending portion defining a bore adapted to receive the outer race of a bearing that rotatably supports the centrifugal rotor. The downwardly depending portion further defines a lip at a lower end thereof that extends at least partially over an end face defined by the outer race of the bearing. The lip acts to retain the bearing in a predefined position. The lower end of the downwardly extending portion extends into the groove defined by the pump wheel and cooperates therewith to define a drainage pump. Accordingly, during operation of the centrifugal separator, oil separated from gas generated by the internal combustion engine, flows through the bearing and onto the pump wheel. The rotation of the pump wheel causes the oil to flow from a smaller to a larger diameter of the pump wheel. In so doing, the oil passes through the drainage pump and is then thrown into the drainage chamber. The drainage pump also minimizes the potential for oil to flow from the drainage chamber to the separating chamber. Moreover, while providing a sealing function, the drainage pump also allows for pressure equalization between the separation and sealing chambers.

In yet another embodiment of the present invention, the means defining a flow path includes at least one aperture positioned near the outer race of the bearing and above the pump wheel. During operation, oil separated from the gas generated by the combustion engine flows through the aperture, into the drainage chamber and onto the separation disc. The rotation of the separation disc causes the oil to be thrown from an edge thereof, into the drainage chamber. The at least one aperture can also include a plurality of apertures extending circumferentially around the outer race of the bearing to provide a larger number of holes through which separated oil can drain.

In still a further embodiment of the present invention, a bearing sleeve is positioned over an outer race defined by a bearing positioned adjacent to the partition wall. The sleeve includes a sleeve section extending into the drainage chamber and defining an end face extending into a first groove defined by the pump wheel. The partition wall defines a downwardly depending portion having an end extending into a drainage groove defined by the pump wheel. The bearing sleeve and the partition wall cooperate to define a gap there between for allowing separated oil to drain from the separation chamber into the drainage chamber. The bearing sleeve section, the downwardly depending portion of the partition wall and the pump wheel all cooperate to define a drainage pump between the separation chamber and the drainage chamber.

The present invention also resides in a method for draining oil separated from combustion gases from a centrifugal separator in gaseous communication with an internal combustion engine. The centrifugal separator includes a housing that defines an interior separation chamber. A centrifugal rotor is rotatably coupled to the housing and extends into the separation chamber. Drive means are provided to cause rotation of the centrifugal rotor. A drainage chamber is positioned adjacent the separation chamber and is delimited therefrom by a partition wall. Means defining a flow path are provided through which oil, separated from gases generated by the internal combustion engine can travel via gravity from the separation chamber to the drainage chamber. A pump wheel is coupled to a shaft portion defined by the rotor and extends radially outwardly therefrom. The pump wheel is positioned in the drainage chamber and is rotatable with the rotor.

Upon operation of the internal combustion engine, the drive means causes the rotor of the centrifugal separator to spin. Gas generated by the internal combustion engine enters the separation chamber and includes entrained material such as oil therein. The centrifugal separator operates to separate the entrained material from the gas so that the oil (which forms part of the entrained material) collects in the separation chamber and flows to an inner surface defined by the partition wall where, via gravity and the means defining a flow path, the oil drains from the separation chamber into the drainage chamber and into contact with the pump wheel. The rotation of the pump wheel imparts centrifugal force to the oil thereby causing the oil to be thrown from the pump wheel into the drainage chamber. The rotation of the pump wheel also minimizes the potential for the egress of oil from the drainage chamber into the separation chamber due to the tendency of oil contacting the pump wheel to be thrown, via centrifugal force generated thereby, back into the drainage chamber.

DETAILED DESCRIPTION OF THE PREFERRED EMBODIMENTS OF THE PRESENT INVENTION

Figure 2:
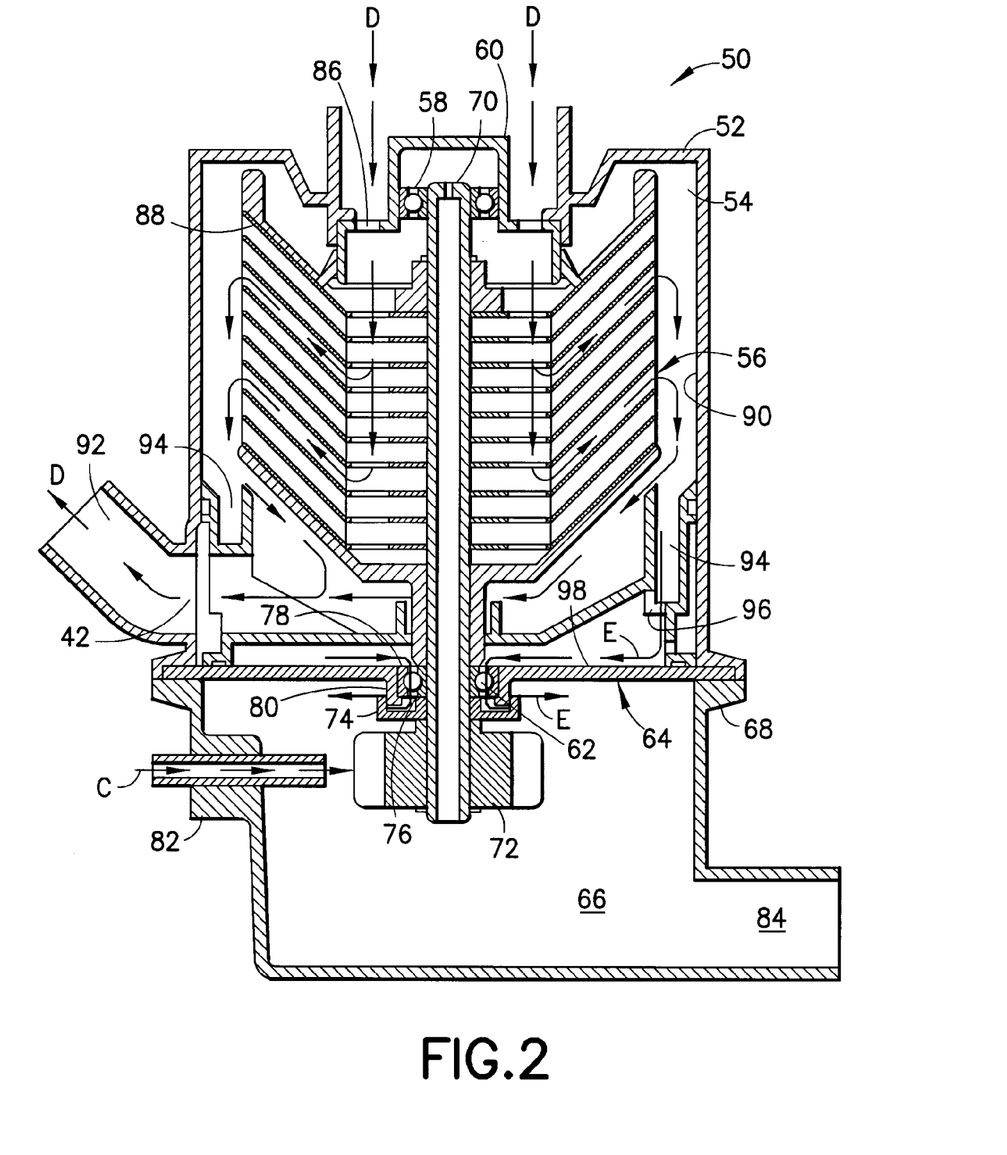
FIG. 2 is a cross-sectional view of a centrifugal separator configured in accordance with the present invention.

As shown in FIG. 2 a centrifugal separator generally designated by the reference number 50 includes a stationary housing 52 that defines an interior separation chamber 54. A centrifugal rotor generally designated by the reference number 56 is rotatably positioned in the separation chamber 54. An upper bearing, 58 is mounted to a bearing housing 60, which in turn is attached to the stationary housing 52. A lower bearing 62 is mounted to a partition wall 64 which delimits the separation chamber 54 from an interior drainage chamber 66 defined by a drainage housing 68. The drainage housing 68 is in turn coupled to the stationary housing 52 at a lower end thereof. A drive shaft 70 forming part of the centrifugal rotor 56 is supported for rotation in the upper and lower bearings, 58 and 62 respectively. A portion of the drive shaft 70 extends through the lower bearing 62 and into the drainage chamber 66.

A turbine 72 is positioned in the drainage chamber 66 and is mounted for rotation on the drive shaft 70. A pump wheel 74 located in the drainage chamber 66 is also mounted on the drive shaft 70. In the illustrated embodiment, the pump wheel 74 is sandwiched between and in engagement with the turbine 72 and an inner race 76 defined by the lower bearing 62. An outer race 78 defined by the lower bearing 62 is mounted in a bore defined by a centrally located, downwardly depending portion 80 defined by the partition wall 64.

During operation of the centrifugal separator, fluid, preferably oil, is directed under pressure through an oil inlet 82 as indicated by the arrows labeled "C" to impinge against the turbine 72 causing it, and thereby the centrifugal rotor 56 to spin. The oil can be pressurized by the internal combustion engine, a pump or any other suitable pressure source. After impinging on the turbine 72, the oil exits the centrifugal separator via an outlet 84 defined by the drainage housing 68. While a turbine 72 and pressurized oil "C" have been shown and described as driving the centrifugal rotor 56, the present invention is not limited in this regard. Other drives known to those skilled in the pertinent art to which the present invention pertains, such as, for example, an electric motor can be substituted without departing from the broader aspects of the present invention.

With the centrifugal rotor 56 spinning, gas generated by the internal combustion engine (not shown), such as crankcase gas, is introduced into the separation chamber 54 through inlet apertures 86 defined by the bearing housing 60 as indicated by the arrows labeled by the reference character "D." The gas "D" travels into a number of stacked, frusto-conical discs 88. The discs 88 are substantially coaxial with the drive shaft 70 and rotate therewith. Each successive pair of discs 88 defines a gap there between through which the gas "D" travels. As the gas "D" travels between the discs 88, centrifugal force acts on the gas causing any entrained material, particularly oil, to be separated from the gas and to travel along undersides of the discs. This separated oil, once it reaches a peripheral edge of the discs 88 is thrown therefrom against an interior wall 90 defined by the stationary housing 52. The cleaned gas "D" exits the centrifugal separator 50 through an outlet 92. While the frusto-conical discs 88 are shown in the illustrated embodiment as all being oriented in one direction (upward in the illustrated embodiment), the present invention is not limited in this regard as the discs can also be oriented in an opposite direction without departing from the broader aspects of the present invention. Moreover, a portion of the discs can be oriented in one manner while another portion can be oriented in a different manner.

Once the oil has been thrown via centrifugal force from the peripheral edges of the discs 88 against the inner wall 90 of the stationary housing 52, the oil flows via gravity down the inner wall and into a drainage channel 94 located in the separation chamber 54. Once in the drainage channel 94 the oil flows through an aperture 96 in a lower portion of the drainage channel as indicated by the arrows labeled "E." The oil then collects on a surface 98 of the partition wall 64. The separated oil then travels towards and through the lower bearing 62 between the inner and outer races, 76 and 78 respectively. This is best seen in FIG. 3.

Figure 3:
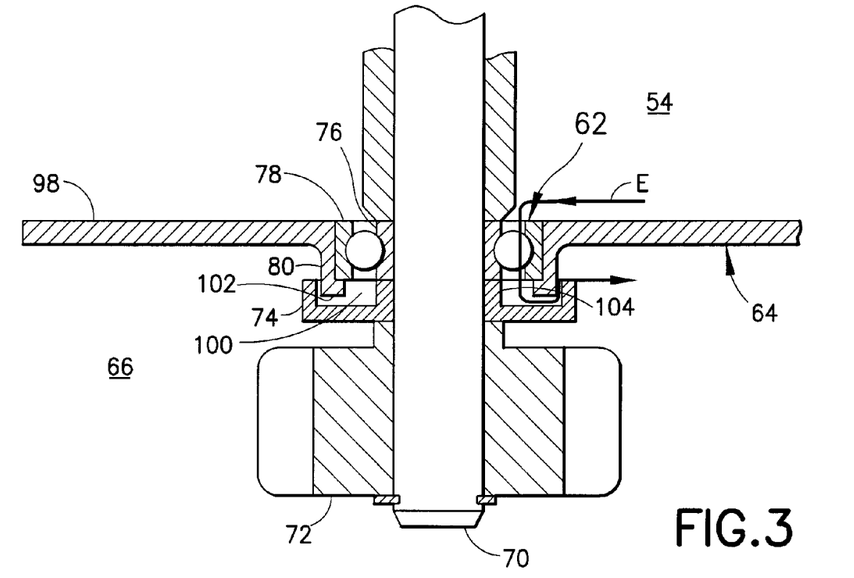
FIG. 3 is a partial cross-sectional view of a drainage pump configured in accordance with the present invention.

Referring to FIG. 3 the oil passes through the lower bearing 62, into the drainage chamber 66 and onto the pump wheel 74. Rotation of the pump wheel 74 causes the oil to flow from an inner diameter to the outer peripheral edge of the pump wheel where the oil is thrown off the pump wheel into the drainage chamber. In the illustrated embodiment, the pump wheel defines a groove 100, and the downwardly depending portion 80 of surface 98 of the partition wall 64 defines a lip 102 that extends at least part-way over an end face of the outer race 78 of the lower bearing 62. A side wall 104 that in-part defines the groove 100 is positioned between and engages the turbine 72 and the inner race 76 of the lower bearing 62. In addition, an end of the downwardly depending portion 80, of the partition wall 64 extends into the groove 100 and in cooperation therewith forms a drainage pump.

During operation, the drainage pump allows oil to discharge from the separation chamber 54 into the drainage chamber 66 and also inhibits the egress of oil from the drainage chamber into the separation chamber where the oil could contaminate the already cleaned gases. Furthermore, because the drainage pump essentially defines a flow path, albeit circuitous, between the separation chamber 54 and the drainage chamber 66, the two chambers can become pressure equalized thereby further decreasing the undesirable egress of oil into the separation chamber.

Figure 4:
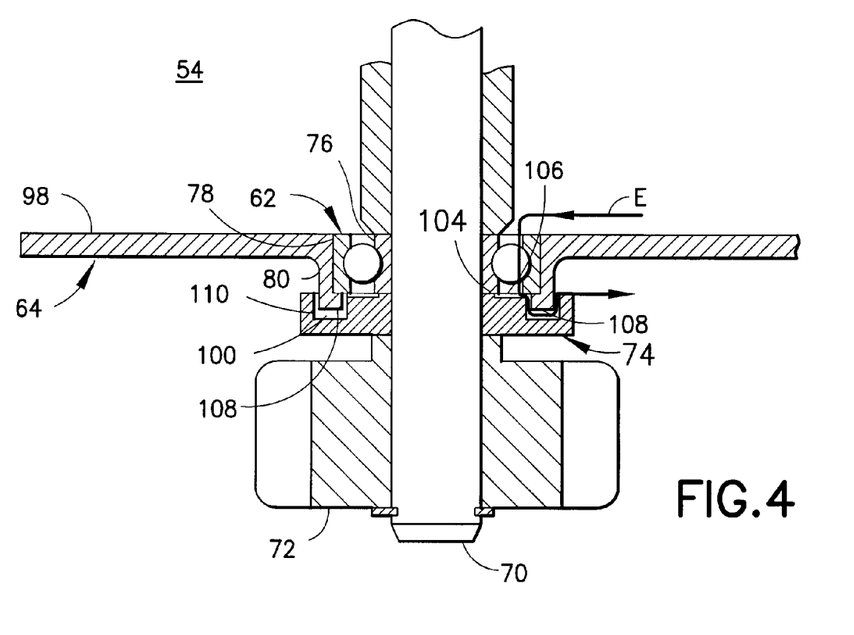
FIG. 4 is a partial cross-sectional view of an alternate embodiment of the drainage pump of the present invention.

As shown in FIG. 4 which is similar in many respects to FIG. 3, the side wall 104 of the pump wheel 74 includes a step having a landing surface 106 that extends between the inner and outer races, 76 and 78 respectively, of the lower bearing 62 forming a first gap between the landing surface and the inner and outer races. A step face 108 defining in part the groove 100 and an inner surface 110 of the downwardly depending portion 80 cooperate to define a second gap there between. A lower end of the downwardly depending 80 and a bottom surface defining the groove 100 cooperate to define a third gap there between. An outer side wall defining the groove 100 and an outer surface of the downwardly depending portion 80 cooperate to define a fourth gap there between. The first through fourth gaps all cooperate to define the drainage pump.

Figure 5:
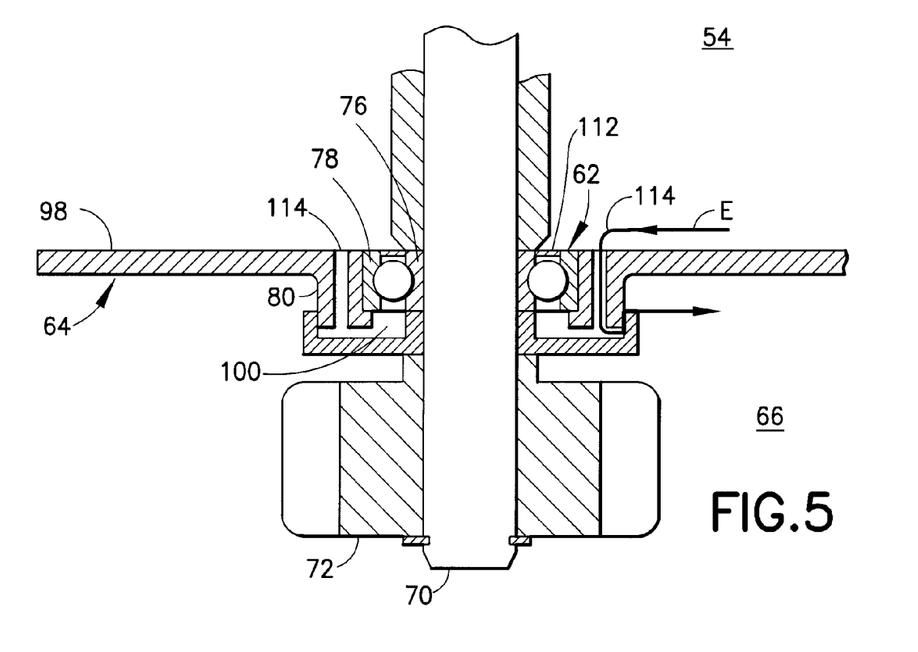
FIG. 5 is a partial cross-sectional view of an alternate embodiment of the drainage pump of the present invention.

As shown in FIG. 5, the lower bearing 62 can include a seal 112 extending between the inner and outer races, 76 and 78 respectively; accordingly, oil cannot flow there between. Instead, the downwardly depending portion 80 of the partition wall 64 defines apertures 114 extending there through, through which the separated oil "E" can drain, via gravity, from the separation chamber 54 to the drainage chamber 66.

Figure 6:
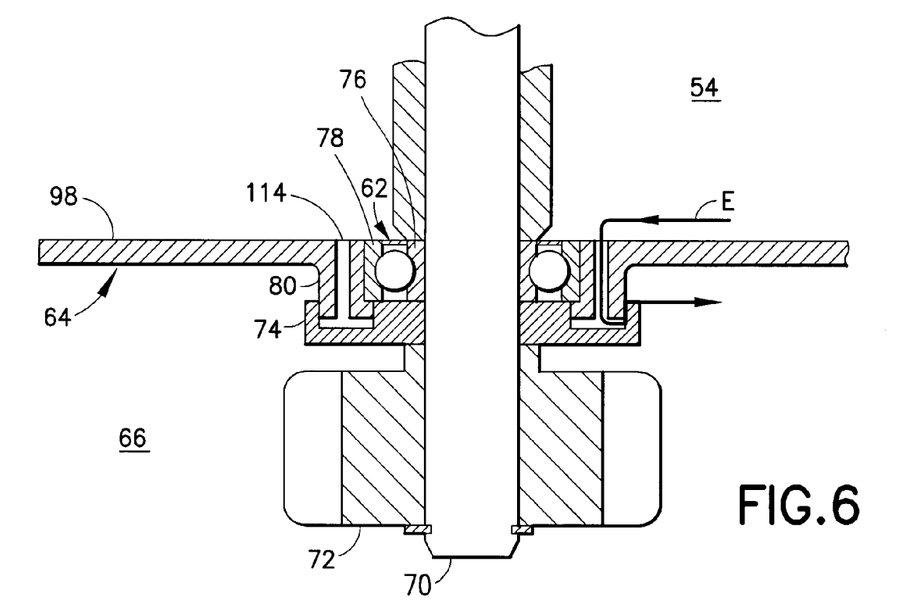
FIG. 6 is a partial cross-sectional view of an alternate embodiment of the drainage pump of the present invention.

Referring to FIG. 6, the drainage pump shown is the same as that shown in FIG. 4 except that the lower bearing 62 is sealed between the inner and outer races, 76 and 78 respectively, and the separated oil drains via gravity through the apertures 114 as described with respect to FIG. 5.

Figure 7:
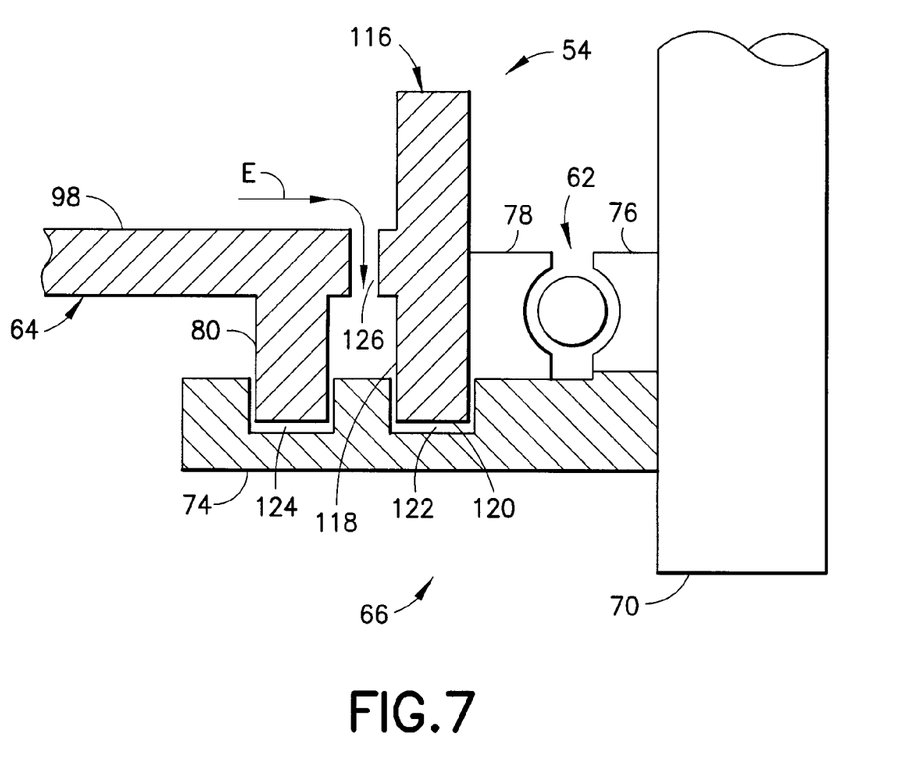
FIG. 7 is a partial cross-sectional view of an alternate embodiment of the drainage pump of the present invention.

As shown in FIG. 7, a bearing sleeve 116 is positioned over the outer race 78 of the lower bearing 62. The bearing sleeve 116 includes a sleeve section 118 extending into the drainage chamber 66 and defining an end face 120 extending into a first groove 122 defined by the pump wheel 74. The downwardly depending portion 80 has an end that extends into a drainage groove 124 also defined by the pump wheel 74. The bearing sleeve 116 and the partition wall 64 cooperate to define a gap 126 there between for allowing separated oil to drain from the separation chamber 54 into the drainage chamber 66. The bearing sleeve section, the downwardly depending portion 80 of the partition wall 64 and the pump wheel 74 all cooperate to define a drainage pump between the separation chamber 54 and the drainage chamber 66.

While the above-described pump wheel and the drainage pumps have been shown and described as being positioned below the separation chamber adjacent to the lower bearing, the present invention is not limited in this regard as the pump wheel and drainage pumps described herein can also be positioned adjacent the upper bearing in the bearing housing without departing from the broader aspects of the present invention. Moreover, the pump wheel and the drainage pumps described herein can be employed in virtually any location where it is desirable to allow fluids to flow from one area to another in a single direction but not in an opposing direction.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above-detailed description, but that the invention will include all embodiments falling within the scope of the appended claims.

What is claimed is:

1. A centrifugal separator for cleaning gases generated by an internal combustion engine, said separator comprising:
   a housing defining an interior separation chamber;
   a centrifugal rotor rotatably coupled to said housing and extending into said separation chamber;
   driving means for causing rotation of said centrifugal rotor;
   a drainage chamber positioned adjacent said separation chamber;
   said separation chamber and said drainage chamber being delimited by a partition wall;
   means defining a flow path through which oil, separated from gases generated by an internal combustion engine and collecting on said partition wall, can travel from said separation chamber to said drainage chamber, said means defining a flow path also allowing for pressure to be equalized in said separation and drainage chambers; and
   a pump wheel coupled to a shaft portion defined by said rotor and extending radially outwardly therefrom so that during operation said oil, upon exiting said separation chamber, contacts said pump wheel whereby centrifugal forces generated due to the rotation of said pump wheel cause said oil to be thrown into said drainage chamber, said pump wheel also minimizing the potential for oil resident in said drainage chamber from re-entering said separation chamber.

2. A centrifugal separator as defined by claim 1 wherein:
   said means defining a flow path includes:
   a bearing having an inner race mounted on said shaft portion of said rotor and an outer race coupled to said partition wall;
   wherein during operation, said oil drains via gravity form said separation chamber, through said bearing, and onto said pump wheel; and
   said pump wheel is positioned in said drainage chamber, below and adjacent to said bearing.

3. A centrifugal separator as defined by claim 2, wherein:
   said pump wheel defines an annular groove extending there around;
   said partition wall includes a downwardly depending portion defining a bore adapted to receive said outer race;
   said downwardly depending portion further defining a lip at a lower end thereof, said lip extending at least partially over an end face defined by said outer race to retain said bearing in a predefined position; and wherein
   said lower end extends into said groove defined by said pump wheel so that said pump wheel and said downwardly depending portion of said partition wall cooperate to define a drainage pump.

4. A centrifugal separator as defined by claim 3 wherein said pump wheel defines an end face in engagement with an end face defined by said inner race thereby causing said pump wheel to be operable as a bearing spacer.

5. A centrifugal separator as defined by claim 1 wherein said drive means includes:
   a turbine positioned in said drainage housing and coupled to said shaft portion of said rotor for rotation therewith; and
   means for directing a stream of pressurized oil to impinge upon said turbine causing rotation thereof and thereby rotation of said rotor.

6. A centrifugal separator as defined by claim 4 wherein said pump wheel defines a stepped portion defining a landing surface extending between said inner and outer races and a step face defining, at least in part, said groove;
   said landing surface and said inner and outer races cooperating to form a first gap there between;
   said step face and an inner surface of said downwardly depending portion cooperating to define a drainage gap there between;
   said lower end of said downwardly depending surface and a bottom surface defining said groove cooperating to define a third gap there between;
   an outer side wall defining said groove and an outer surface of said downwardly depending portion cooperating to define a fourth gap there between; and
   said first gap, said drainage gap, said third gap, and said fourth gap cooperating to define said drainage pump.

7. A centrifugal separator as defined by claim 3 wherein:
   said means defining a flow path includes said downwardly depending portion of said partition wall defining at least one aperture extending there through adjacent said bore, said aperture opening into said groove defined by said pump wheel so that oil can drain there through into said groove.

8. A centrifugal separator as defined by claim 7 wherein said at least one aperture includes a plurality of apertures extending circumferentially around said bore.

9. A centrifugal separator as defined by claim 7 wherein said bearing includes a seal extending between said inner and outer races, and said oil drains from said separation chamber into said drainage chamber through said at least one aperture.

10. A centrifugal separator as defined by claim 7 wherein said pump wheel defines a stepped portion defining a landing surface extending between said inner and outer races and a step face defining, at least in part, said groove;
    said landing surface and said inner and outer races cooperating to form a first gap there between;
    said step face and an inner surface of said downwardly depending portion cooperating to define a drainage gap there between;
    said lower end of said downwardly depending surface and a bottom surface defining said groove cooperating to define a third gap there between;
    an outer side wall defining said groove and an outer surface of said downwardly depending portion cooperating to define a fourth gap there between; and
    said first gap, said drainage gap, said third gap, and said fourth gap cooperating to define said drainage pump.

11. A centrifugal separator as defined by claim 1 wherein said rotor further comprises:
    a plurality of stacked discs positioned in said separation chamber and substantially coaxial with said shaft portion for rotation therewith, each of said discs defining a separation gap with the next successive disc in the stack.

12. A centrifugal separator as defined by claim 11 wherein said discs are each frusto-conical.

13. A centrifugal separator as defined by claim 1 further comprising
  a bearing having an inner race mounted on said shaft portion of said rotor;
  a bearing sleeve positioned over an outer race defined by said bearing, said sleeve including a sleeve section extending into said drainage chamber and defining an end face extending into a first groove defined by said pump wheel;
  said partition wall defining a downwardly depending portion having an end extending into a drainage groove defined by said pump wheel; said bearing sleeve and said partition wall cooperating to define a gap there between for allowing separated oil to discharge from said separation chamber into said drainage chamber; and wherein
  said bearing sleeve section, said downwardly depending portion of said partition wall and said pump wheel cooperate to define a drainage pump between said separation chamber and said drainage chamber.

14. A method for draining oil separated from combustion gases from a centrifugal separator, said method comprising the steps of:
  providing a centrifugal separator in gaseous communication with an internal combustion engine, said centrifugal separator having:
  a housing defining an interior separation chamber;
  a centrifugal rotor rotatably coupled to said housing and extending into said separation chamber;
  drive means for causing rotation of said centrifugal rotor;
  a drainage chamber positioned adjacent said separation chamber;
  said separation chamber and said drainage chamber being delimited by a partition wall;
  means defining a flow path through which oil, separated from gases generated by said internal combustion engine and collecting on said partition wall can travel from said separation chamber to said drainage chamber; and
  a pump wheel coupled to a shaft portion defined by said rotor and extending radially outwardly therefrom; said pump wheel being positioned in said drainage chamber and rotatable with said rotor;
  upon operation of said internal combustion engine, causing said drive means to rotate said rotor of said centrifugal separator;
  introducing gas generated by said internal combustion engine into said separation chamber, said gas including entrained material such as oil therein;
  said centrifugal separator operating to separate said entrained material from said gas so that said oil collects in said separation chamber on a surface defined by said partition wall where, via gravity and said means defining a flow path, said oil drains from said separation chamber into said drainage chamber and into contact with said pump wheel;
  imparting, via the rotation of said pump wheel, centrifugal force to said oil thereby causing said oil to be thrown from said pump wheel into said drainage chamber; and wherein
  said rotating pump wheel minimizes the potential for the ingress of oil from said drainage chamber into said separation chamber due to the tendency of oil contacting said pump wheel to be thrown, via centrifugal force generated thereby, back into said drainage chamber.

15. A method as defined by claim 14 wherein:
  said means defining a flow path includes a bearing having an inner race mounted on said shaft portion of said rotor and an outer race coupled to said partition wall; and wherein
  said step of said oil draining from said separation chamber to said drainage chamber includes said oil draining between said inner and outer races of said bearing.

16. A method as defined by claim 14 wherein said centrifugal separator includes a bearing having an inner race mounted on said shaft portion of said rotor and an outer race coupled to said partition wall, and at least one aperture positioned above said pump wheel and extending through said partition wall; and wherein
  said step of said oil draining from said separation chamber to said drainage chamber includes said oil draining through said at least one aperture.

17. A method as defined by claim 14 wherein:
  said pump wheel defines an annular groove extending there around;
  said partition wall includes a downwardly depending portion defining a bore adapted to receive said outer race;
  said downwardly depending portion further defining a lip at a lower end thereof, said lip extending at least partially over an end face defined by said outer race to retain said bearing in a predefined position; and wherein
  said lower end extends into said groove defined by said pump wheel so that said pump wheel and said downwardly depending portion of said partition wall cooperate to define a drainage pump; and wherein
  prior to said step of said oil being thrown from said pump wheel into said drainage chamber; said oil travels through said drainage pump.

18. A method as defined by claim 14 wherein:
  said centrifugal separator further includes:
  a bearing having an inner race mounted on said shaft portion of said rotor;
  a bearing sleeve positioned over an outer race defined by said bearing, said sleeve including a sleeve section extending into said drainage chamber and defining an end face extending into a first groove defined by said pump wheel; said partition wall defining a downwardly depending portion having an end extending into a drainage groove defined by said pump wheel;
  said bearing sleeve and said partition wall cooperating to define a gap there between for allowing separated oil to drain from said separation chamber into said drainage chamber; and wherein
  said bearing sleeve section, said downwardly depending portion of said partition wall and said pump wheel cooperated to define a labyrinth type seal between said separation chamber and said drainage chamber; and wherein
  prior to said step of said oil being thrown from said pump wheel into said drainage chamber; said oil travels through said drainage pump.

* * * * *